United States Patent
Znamova et al.

(10) Patent No.: US 7,843,815 B2
(45) Date of Patent: Nov. 30, 2010

(54) ESTIMATION OF TIME-VARYING LATENCY BASED ON NETWORK TRACE INFORMATION

(75) Inventors: Dana Znamova, Rockville, MD (US);
Patrick J Malloy, Washington, DC (US); John Strohm, Rockville, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 418 days.

(21) Appl. No.: 11/752,283

(22) Filed: May 22, 2007

(65) Prior Publication Data
US 2007/0217343 A1   Sep. 20, 2007

Related U.S. Application Data

(63) Continuation-in-part of application No. 11/490,586, filed on Jul. 21, 2006.

(60) Provisional application No. 60/709,776, filed on Aug. 19, 2005, provisional application No. 60/803,767, filed on Jun. 2, 2006.

(51) Int. Cl.
*G01R 13/08* (2006.01)

(52) U.S. Cl. .................................. 370/229

(58) Field of Classification Search ................ None
See application file for complete search history.

(56) References Cited

U.S. PATENT DOCUMENTS

| | | | |
|---|---|---|---|
| 5,802,106 A * | 9/1998 | Packer | 375/225 |
| 6,633,559 B1 * | 10/2003 | Asokan et al. | 370/350 |
| 6,801,940 B1 | 10/2004 | Moran et al. | |
| 6,891,841 B2 * | 5/2005 | Leatherbury et al. | 370/401 |
| 6,975,656 B1 * | 12/2005 | Madhavapeddi et al. | 370/518 |
| 2005/0213586 A1 * | 9/2005 | Cyganski et al. | 370/395.41 |
| 2006/0235961 A1 * | 10/2006 | Klein et al. | 709/224 |

* cited by examiner

*Primary Examiner*—Chi H Pham
*Assistant Examiner*—Fan Ng
(74) *Attorney, Agent, or Firm*—Robert M. McDermott, Esq.

(57) ABSTRACT

Time-varying latency is estimated based on the round-trip time between the time of sending a message and the time of receiving an acknowledgement of receipt of the message. The round-trip time relative to a transmitter is modeled as a combination of known, or determinable, delays, plus an unknown latency, plus a processing/acknowledgement delay at the receiver. The estimated time-varying latency is further refined to give more weight to estimates based on fewer unknowns or a lesser magnitude of unknowns, and to impose physical constraints, such as assuring that the estimate does not imply an unrealizable event. TCP-specific constraints and assumptions are also applied to further refine the latency estimates.

47 Claims, 5 Drawing Sheets

ESTIMATION OF TIME-VARYING LATENCY BASED ON NETWORK TRACE INFORMATION

This application is a continuation-in-part of U.S. patent application Ser. No. 11/490,586, filed 21 Jul. 2006, incorporated by reference herein, and claims the benefit of U.S. Provisional Patent Application 60/709,776, filed 19 Aug. 2005 and 60/803,767, filed 2 Jun. 2006.

BACKGROUND AND SUMMARY OF THE INVENTION

This invention relates to the field of network analysis, and in particular to a technique for estimating the time-varying network latency based on limited traffic trace information. The estimate of time-varying network latency facilitates analysis of the network's performance, and facilitates the estimation of other parameters, such as the estimated transmit time of a received packet, or the estimated receive time of a transmitted packet.

A variety of tools have been developed, and continue to be developed, to facilitate the management of communication networks, and in particular for managing networks that provide communications among computer devices. Many of these tools are configured to model the network's performance under a variety of traffic conditions, both real and hypothesized, and in many cases, base this performance on data collected from the actual network.

Network monitoring devices, commonly referred to as "capture agents", "sniffers", or "protocol analyzers", are often used to capture traffic flow information. Such devices are placed at various points within the network and are configured to monitor the traffic flowing through that point. Generally, these traffic monitoring devices create a record of each message's header information and the time at which the message was detected; if the monitoring device is configured to monitor multiple communication paths at its location, the path information is also stored in the record. The collection of records from one or more monitoring devices is termed 'trace information'.

Ideally, a network monitoring device would be placed at each node location in a network, so that the time of occurrence (transmission or reception) of each message is accurately recorded. Often, however, the number of monitoring devices is substantially less than the number of nodes of a network, and the times of occurrence of each message at each node can only be estimated, based on the limited availability of trace information.

One of the primary parameters for analyzing or assessing the performance of a network is the time it takes for messages to reliably reach their destination. This time is dependent upon a variety of factors. The message must enter the network, and incurs a delay as it gains network access. When it enters the network, it incurs a delay that is dependent upon the bandwidth available at each link. It may also incur queuing delays as it passes through intermediate nodes, particularly at congested links. Upon arrival at the receiving node, a delay is incurred as the proper receipt of the message is verified. Some of these factors are constant, while others vary over time, typically dependent on network loading.

For ease of reference, the time required for a message/packet to travel from a source node to a destination node is said to comprise a minimum bandwidth-dependent delay, which is determinable/calculatable, and a remainder unknown delay, termed latency.

It would be advantageous to be able to determine time-varying latency estimates based on limited trace information. It would also be advantageous to refine these latency estimates based on known physical limitations. It would also be advantageous to be able to refine these latency estimates based on known protocol characteristics, and in particular, characteristics associated with the Transmission Control Protocol (TCP). It would also be advantageous to use these latency estimates to estimate other parameters related to the monitored network traffic. It would also be advantageous to provide these latency estimates to other network analysis tools.

These advantages can be realized by a method and system that estimates time-varying latency based on the round-trip time between the time of sending a message and the time of receiving an acknowledgement of receipt of the message. The round-trip time relative to a transmitter is modeled as a combination of known, or determinable, delays, plus a time-varying latency, plus a processing/acknowledgement delay at the receiver. The estimated time-varying latency is further refined to give more weight to estimates based on fewer or lesser unknowns, and to impose physical constraints, such as assuring that the estimate does not imply an unrealizable event. TCP-specific constraints and assumptions are also applied to further refine the latency estimates.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention is premised on the observation that, generally, communications between two nodes correspond to a 'dialog'; that is, the messages communicated between the nodes are related/responsive to each other. If related/responsive message pairs can be identified, the "round-trip-time" between the sending of a message and the receipt of the corresponding response can be determined, and an analysis of such round-trip-times can facilitate a determination of the latency that the message is likely to have encountered.

Figure 1A:
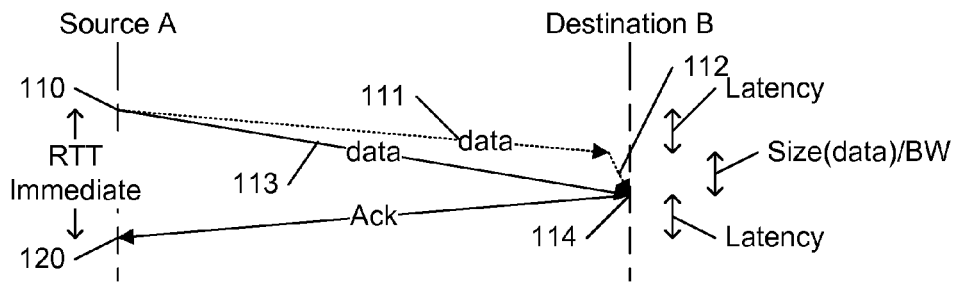
FIGS. 1A and 1B illustrate an example of traffic between two nodes, and the corresponding determinable round-trip times.
Figure 1B:
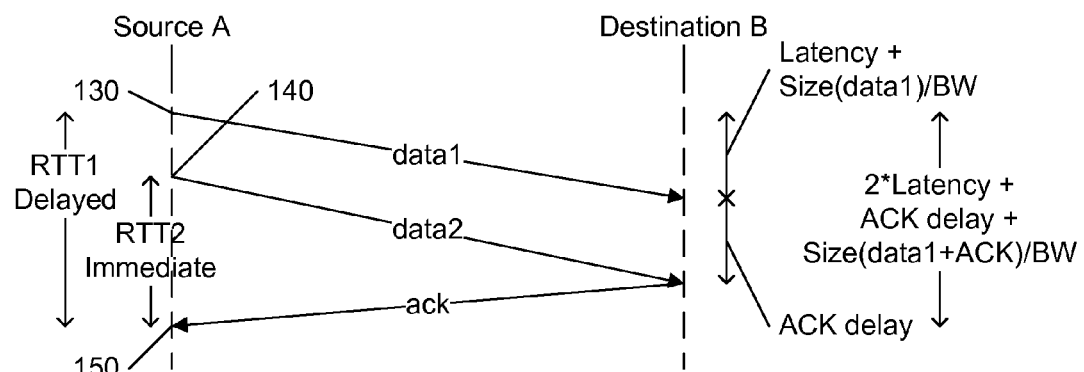

FIGS. 1A-1B illustrate example timing diagrams of traffic between different configurations of remote and local nodes, to facilitate an understanding of the underlying principles of this invention. In each of these figures, an arrow between the lines labeled Source and Destination illustrates the transmission of a message between a pair of source-destination nodes, the slope of the arrow being indicative of the time required for the message to travel between the nodes, and, as noted above, may include any number of delays, including network access delay, bandwidth delay, long-distance propagation delay, queuing delays at intermediate switches, and so on, as the message travels between nodes. The connection of the head of an arrow/message to the tail of a next arrow/message at the destination node indicates that the second message is in response to the first message, the length of the connection being indicative of a response-delay time at the destination node.

FIG. 1A illustrates an example exchange of a single packet from source node A to destination node B, and a corresponding acknowledgement of receipt of the packet from destination node B to source node A. In the examples used herein, a packet is used as a representative message element, although one of skill in the art will recognize that the principles of this invention may be applied to protocols other than packet-based protocols. In like manner, the acknowledgement from the destination node B is used as a representative response to a transmitted message, although one of skill in the art will recognize that the principles of this invention may be applied to the use of other types of response messages.

An acknowledgement is generally sent after the entire packet is received; thus, the time required for the packet sent from A to B to be acknowledged at B is modeled as an unknown latency time plus a known minimum bandwidth-dependent time to communicate the entire packet, based on the size of the packet.

In FIG. 1A, these two delay components of the packet 113 from A to B are illustrated by dashed lines 111 and 112, the line 111 representing, for example, the transmission of the first byte of the packet between nodes A and B, and the line 112 representing the delay in receiving the remainder of the bytes in the packet. This delay may be introduced anywhere along the path from A to B, and is merely illustrated at the destination B for convenience, and, as noted above, is the minimum time required to pass the entire packet through the channel between nodes A and B. This minimum time is equal to the size of the message divided by the bandwidth of the channel between nodes A and B, the bandwidth of the channel being limited by the bandwidth of the narrowest link in the channel. For convenience, this minimum bandwidth-dependent delay is herein termed the minimum bandwidth delay, or simply the bandwidth delay. As noted above, any additional time above the determinable bandwidth delay incurred during the transmission of the packet from node A to node B, or other determinable delays, discussed further below, is defined herein as the latency.

In like manner, the delay incurred in the transmission of the acknowledgement from node B at time 114 to its receipt at node A at time 120 is modeled as the minimum transmit time to transmit the acknowledgement, based on its size and the channel minimum bandwidth, plus a remainder latency.

Any of a variety of techniques can be used to determine the minimum bandwidth between nodes, and thereby determine the corresponding determinable minimum bandwidth delay. In a straightforward embodiment, the user, typically a network manager, provides this information directly, based on the known configuration of the network. Alternatively, or additionally, automated tools, such as BPROBE and CPROBE from the "OCEANS" group at Boston University, may be used to determine the minimum bandwidth between nodes, as detailed in "Measuring Bottleneck Link Speed in Packet-Switched Networks", by Robert L. Carter and Mark E. Crovella, TR-96-006, Boston University Computer Science Department, Mar. 15, 1996, and revised in *Performance Evaluation*, Vol 27&28, 1996, Selected Papers from the Proceedings of Performance '96, Lausanne, Switzerland, October 1996.)

In most networks, the communication links are substantially symmetric and relatively time invariant over short time intervals. As such, it can be assumed that the latency experienced by a transmission of data from A to B is substantially equal to the latency experienced by the transmission of a response from B to A. If the particular link is known to be asymmetric, such as satellite downlink and a telephone uplink, and a relationship between the directional links can be estimated (e.g. $\text{latency}_{A-B}=10*\text{latency}_{B-A}$), based on heuristics or other techniques, corresponding modifications to the symmetry assumption used herein may be applied.

In each of the examples presented herein, it is assumed that the capture agent is located at the source node (A), so that the transmit time of the original message and the receive time of the response to the original message is available for determining the roundtrip time. From this determined roundtrip time, the latency can be estimated, and from the estimated latency, the corresponding packet receive time and acknowledgement transmit time at the destination node (B) can be estimated. The estimated latency may also be provided to other network analysis tools. The captured information may be pre-processed and stored for subsequent "off-line" analysis to determine the latencies, or a system that embodies this invention may be configured to receive the captured information directly from the capture agent or its proxy, for "on-line" analysis. Such on-line analysis is particularly useful for diagnosing reported degradations in network performance and other network anomalies.

In the example of FIG. 1A, it is assumed that the response from node B is transmitted immediately upon receipt of the packet from node A, or, equivalently, that a minimum processing time at the receiving node is included in the unknown latencies. Using the aforementioned link-symmetry assumption, the round-trip time, RTT, measured at node A, that is, the difference between the time 110 that the message is sent until the time 120 that the (entire) response is received, is equal to twice the latency ($\text{latency}_{A-B}+\text{latency}_{B-A}$) plus the minimum bandwidth delay, which is equal to the size of each packet (data and acknowledgement) divided by the minimum link bandwidth BW. If different bandwidths are provided in each direction, the bandwidth delay is determined accordingly ($\text{size(data)}/BW_{A-B}+\text{size(ACK)}/BW_{B-A}$). In the symmetric bandwidth case, the latency can be determined as:

$$\text{Latency}=(RTT-(\text{size(data)}+\text{size}(ACK))/BW)/2. \quad (1)$$

As noted above, the example of FIG. 1A assumes that node B responds immediately to the receipt of the packet from node A. FIG. 1B illustrates an example exchange wherein there is a delayed response to a packet. In the Transmission Control Protocol (TCP), for example, a receiver can be configured to respond after a given number of packets are received, or after expiration of a delayed acknowledgement timer.

In FIG. 1B, a first packet (data1) is sent at 130, a second packet (data2) is sent at 140, and a single response (ACK) is received at 150. This response serves as an immediate response to the second packet, and a delayed response to the first packet, providing round trip times RTT2 and RTT1, respectively. Relative to the second packet, the latency can be estimated using equation (1) and RTT2. Relative to the first packet, the round trip time RTT1 includes the bandwidth delay (size(data1)/BW), plus the unknown latency time, plus an unknown response delay time. Thus, if equation 1, above, is used, the unknown latency time will include the unknown response delay time, and thus will be a less accurate estimate of the actual latency incurred by the packet.

Immediate responses can generally be identified based on the particular protocol. For example, in TCP/IP, the acknowledgement of some messages, such as the TCP SYN message that identifies the start of a transaction, is sent 'immediately' per TCP specifications. For subsequent data-carrying packets, a delayed acknowledgement is recognized as an acknowledgement that contains an acknowledgement sequence number that is larger than the transmitted message's sequence number plus its size. An acknowledgement sequence number that is equal to the transmitted message's sequence number plus its size generally indicates an immediate response, but it may correspond to receipt of the packet and a subsequent time-out while the receiver was waiting for the next packet. Thus, different levels of confidence can be associated with each determined latency.

Figure 2:
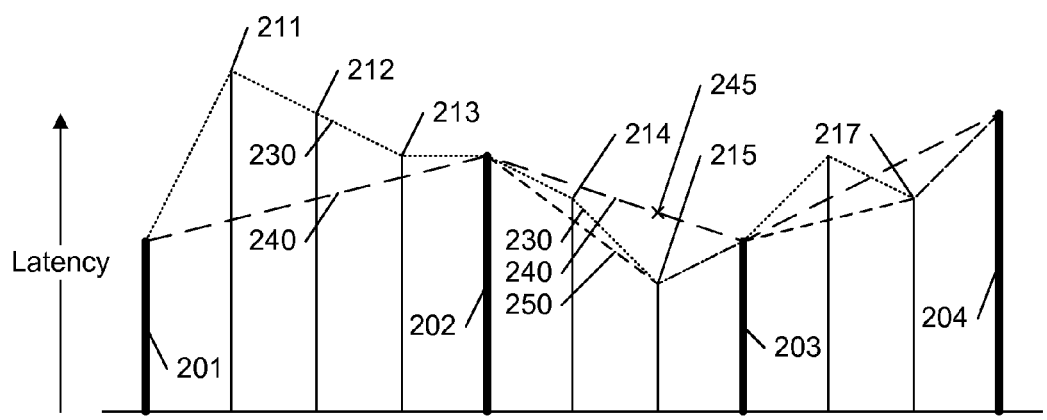
FIG. 2 illustrates the estimation of time-varying latency based on the estimated latency of different classes of round-trip time estimates.

FIG. 2 illustrates an example set of determined latencies, using equation 1. The thicker lines 201-204 indicate latencies determined from immediate-response round-trip times, while the thinner lines 211-217 represent latencies determined from delayed-response round-trip times.

The estimation of the time-dependent latency based on the observed round-trip times can take on a variety of forms. The simplest estimate is based on an assumption that all of the estimated latencies are accurate, and the estimated time-dependent latency is merely a linear relationship between each of the estimated latencies, as indicated by the dotted line 230 of FIG. 2. However, the delayed acknowledgement latencies are known to include the unknown acknowledgement delay at the destination node, and may not always be reliable estimates of the actual network latency.

Another estimate can be based on the assumption that all of the immediate-response latencies are accurate, and none of the delayed-response latencies are relevant to the estimation of the time-dependent latency. A linear relationship between each of these assumed-accurate latencies is indicated by the long-dash line 240 of FIG. 2. However, assuming that the time-varying latency varies linearly between immediate-response latencies can lead to infeasible results. Consider, for example, a packet that provided the delayed-response latency 215 in FIG. 2. In this example, the response was apparently received very quickly, such that the determined latency 215 was slight; i.e. the round-trip time was short. Such a response may occur, for example, if the delayed acknowledgement timer expires very shortly after a packet is received at the remote node.

If the linear relationship 240 is used to estimate the time varying latency, such that the value at 245 is used as the latency associated with this packet and its acknowledgement, the total of 2*(estimated latency 245) plus the bandwidth delay (size(data+ACK)/BW) may exceed the actual round-trip time. Based on this estimate, the estimated time of receipt at the destination will be equal to the send time plus the estimated latency 245 plus the bandwidth delay (size(data)/BW), and the estimated time of sending the acknowledgement will be equal to the acknowledgement-received time less the sum of the estimated latency 245 and the minimum response bandwidth delay (size(ACK)/BW). If the estimated latency 245 is larger than the actual latency experienced by the packet, these estimated time of receipt of the packet and sending the acknowledgement will indicate that the acknowledgement was sent before the packet was received. Because the larger estimated latency 245 implies an infeasible result, it is obviously incorrect, and the actual latency 215 would be a better choice as the estimate.

In a preferred embodiment, estimates that lead to physical impossibilities are identified, and the actual latency is assumed to be accurate, even though it was derived from a delayed-response acknowledgement (or a "possibly" delayed-response acknowledgement). The estimated time-dependent latency is then defined as a linear relationship between each of the assumed accurate determined latencies, as indicated by the short-dashed line 250 of FIG. 2.

One of skill in the art will recognize that a linear relationship between latencies that are determined to be reliable, such as illustrated by the short-dashed line 250 of FIG. 2, is one of many possible methods for deriving a time-dependent estimate of the latency. Other techniques, such as conventional least-squares curve fitting to a polynomial expression, or general time-series estimation techniques can be used as well.

A variety of other techniques can be used to improve the quality of the estimates, based on known or assumed constraints, in addition to the aforementioned constraint of requiring that no acknowledgement can be determined to occur before the acknowledged packet is determined to have arrived. Some such constraints may be determined based on the particular protocol that is being used, the particular type of messages being transmitted, and so on.

In a preferred embodiment of this invention, the detection of a "train" of packets can be used to improve the quality of the latency estimates that are used for determining the time-dependent latencies, because trains exhibit round-trip time characteristics that are atypical of individual packet round-trip characteristics. Typically, a train of packets comprises a sequence of packets that are placed on the network as a continuous stream, without pausing for acknowledgements.

If the link at the transmitter of the train is faster than the minimum bandwidth link in the channel between the transmitter and receiver, the rate at which the packets are transmitted from the source node will generally be faster than the rate at which the packets are received at the destination node, and correspondingly, also faster than the rate at which the acknowledgements are sent from the destination node. Thus, the round-trip times of the later packets in the train will be larger than the round-trip times of the initial packets in the train.

Figure 3A:
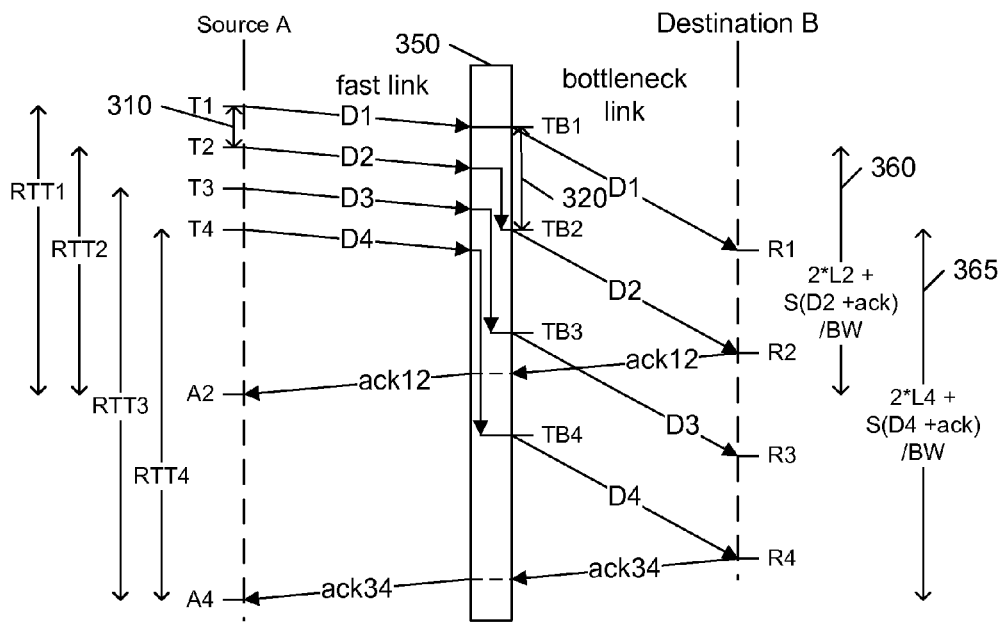
FIGS. 3A-3D illustrate the estimation and refinement of latencies for a train of packets that exhibit self-congestion delays.

FIG. 3A illustrates the transmission of a train of four packets D1-D4 from source A to destination B via a channel that includes a link at A that has a wider bandwidth than a subsequent link that has the minimum bandwidth of the channel between nodes A and B. For simplicity, only two links are illustrated, a wide bandwidth (fast) link from A, and the minimum bandwidth (slow) link to B, joined at a "bottleneck" 350. In a more complex channel, the bottleneck link need not be at the destination node.

The rate at which the packets D1-D4 are transmitted from node A, i.e. the duration between the times T1 to T4, is determined by the bandwidth of the first link in the channel from A to B. That is, if the first bit of the packet D1 is transmitted at time T1, the second packet D2 of the train may be transmitted as soon as the last byte of the first packet D1 is transmitted. The time 310 required to transmit the entire first packet D1 is equal to the size of the packet divided by the bandwidth of the first link, and thus the time T2 of transmitting the first byte of the second packet will be:

$$T2=T1+(\text{size}(D1)/bw(\text{first link})).$$

In like manner, the time of transmission T3, T4 of each of the next packets D3, D4 will be dependent upon the size of each previous packet D1, D2.

Even though these packets D1-D4 leave the source A at a high rate, they will need to be queued at the bottleneck 350 to accommodate the differences in bandwidth. That is, although they leave the source node A quickly, their rapid arrival at the bottleneck causes self-congestion at the bottleneck 350. FIG. 3A illustrates that the transmission of packet D1 from the bottleneck 350 begins upon receipt of packet D1 at the bottleneck, at time TB1; however, the time 320 required to transmit the entire packet D1 from the bottleneck 350 will be equal to the size of packet D1 divided by the minimum bandwidth BW. Thus, the second packet D2 will not be able to be transmitted from the bottleneck 350 until:

$$TB2=TB1+(\text{size}(D1)/BW).$$

In like manner, the time of transmission TB3, TB4 of each of the next packets D3, D4 from the bottleneck 350 will be dependent upon the size of each previous packet D1, D2. The packets D1-D4 from the bottleneck 350 are correspondingly received at destination node B at times R1-R4.

In this example, an acknowledgement is sent from destination B after receiving each pair of packets D1-D2 and D3-D4. These acknowledgements, ack12 and ack34, are received at source A at times A2 and A4, respectively. In this example, the acknowledgements are considered to be of minimal size, and are not substantially affected by the bandwidth limitations.

As can be seen in FIG. 3A, because the packets D1-D4 were transmitted from node A without being limited by the minimum bandwidth, but are subsequently limited by the minimum bandwidth at the bottleneck 350, the later packets in the train D1-D4 exhibit a longer round-trip time than the earlier packets. As the length of a train increases, this increase in round-trip times for later packets will correspondingly increase in a progressive manner, the beginning of the round-trip times for subsequent packets increasing based on how quickly the packets leave the first node A, while the end of the round-trip time increases based on how slowly they leave the bottleneck 350.

The acknowledgements ack12 and ack34 are immediate acknowledgements to packets D2 and D4. Therefore, the time of receipt of each acknowledgement A2 and A4 can be expressed as:

$$A2=T2+\text{latency2}(A\text{ to }B)+\text{size}(D2+ack12)/BW+\text{latency2}(B\text{ to }A);\text{ and}$$

$$A4=T4+\text{latency4}(A\text{ to }B)+\text{size}(D4+ack34)/BW+\text{latency4}(B\text{ to }A).$$

These relationships are illustrated via arrows 360, 365 in FIG. 3A.

Assuming symmetric A-to-B and B-to-A latencies, and noting that RTT2=A2−T2, and RTT4=A4−T4, the latencies L2, L4 associated with each packet D2, D4 can be estimated from the measured roundtrip times as:

$$L2=(RTT2-(\text{size}(D2+ack12)/BW)/2.$$

$$L4=(RTT4-(\text{size}(D4+ack34)/BW)/2.$$

Figure 3B:
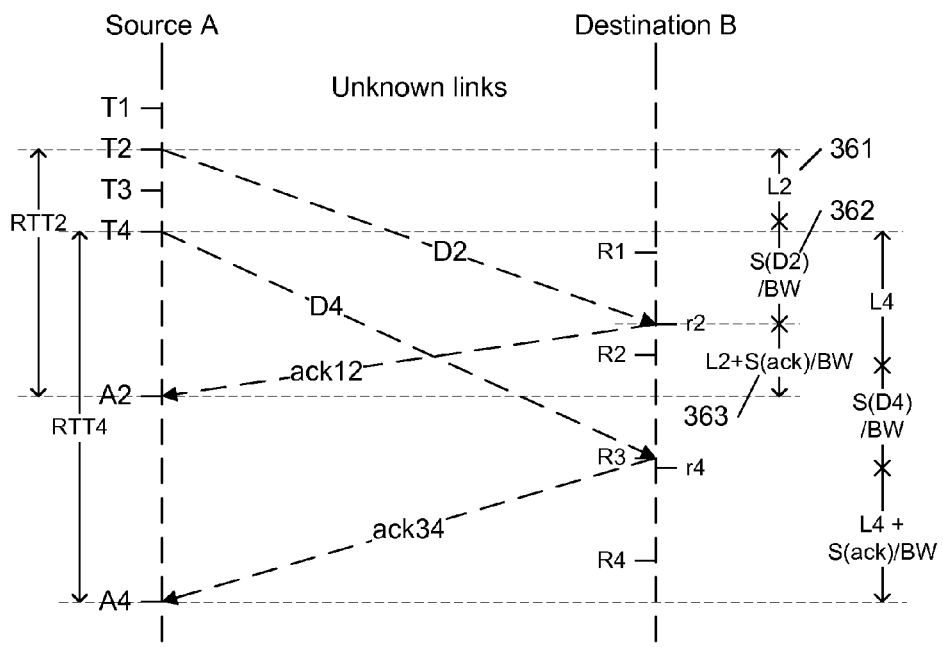

FIG. 3B illustrates an estimation of the receive time of the data packets and transmit time of the acknowledgements at destination B based on these estimated latencies. As noted above, it is assumed that the acknowledgement is sent without delay from the destination, and thus the transmit time of the acknowledgements is substantially equal to the corresponding data packet receive times.

The estimation of receive/transmit times at a destination node can be determined by progressing forward in time from the transmission of the data packet, or backward in time from the receipt of the acknowledgement. With regard to data packet D2, the packet is sent at time T2 and incurs an estimated latency L2 361, computed above, and a determinable bandwidth delay that is equal to size(D1)/BW 362. Thus, the estimated time of receipt of the data packet is illustrated at time r2. Working from the receive time A2 of the acknowledgement, the estimated time of transmission of the acknowledgement is equal to A2 minus the sum of the latency L2 and a bandwidth delay that is equal to size(ack12)/BW, which is coincident with the receive time r2. (As noted above, in this example, the size of each acknowledgement is minimal, and thus the bandwidth delay associated with the acknowledgement is too small to be distinguished from the latency L2).

A similar processing of latency L4 and the bandwidth delay of packet D4 (size(D4)/BW), relative to the time of transmission T4 of packet D4 and the time A4 of receipt of acknowledgement ack34, results in an estimated packet-receive/acknowledgement-transmit time r4 at destination B.

As can be seen in FIG. 3B, the estimated receive time r2 is a fairly close estimate of the actual (but unknown) receive time R2. However, because of the progressive increase in the roundtrip time of later packets in a train, the estimated receive time r4 differs substantially from the actual receive time R4. The cause of the inaccuracy in the estimated receive time r4 in FIG. 3B is due to the fact that the delay that packet D4 incurs is dependent upon the delay at the bottleneck, waiting for the preceding packets to be transmitted from the bottleneck via the minimum bandwidth channel, yet this delay (the remainder of time left after subtracting the bandwidth delay of D4 from the roundtrip time RTT4) is allocated equally to the transmissions of the data packet and the acknowledgement. That is, because the remainder/unknown delay is large, the estimated latency L2 associated with the acknowledgement is substantially overestimated.

Figure 3C:
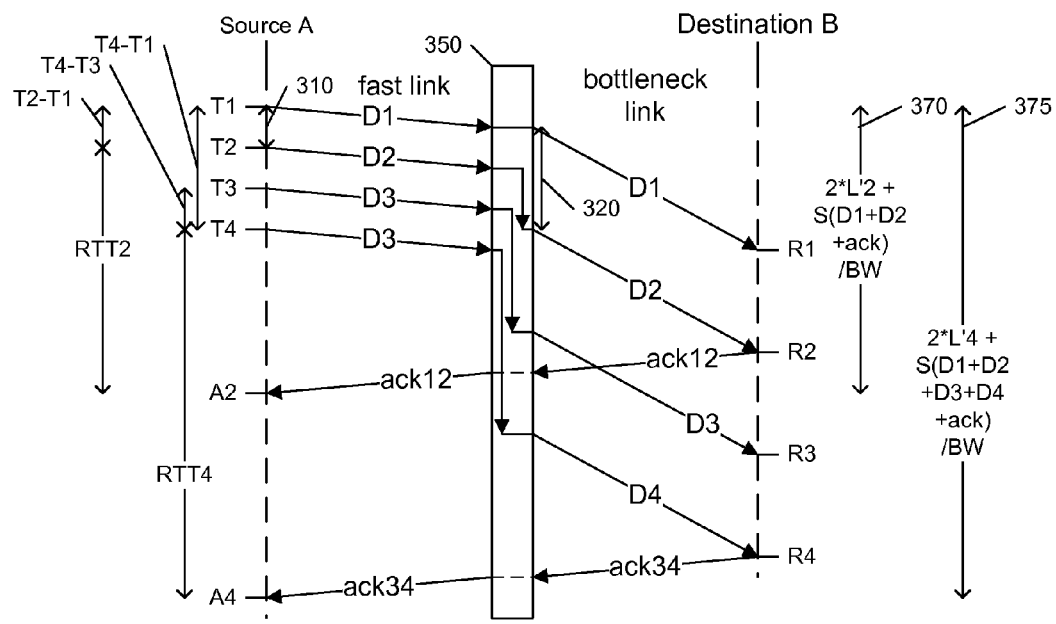
Figure 3D:
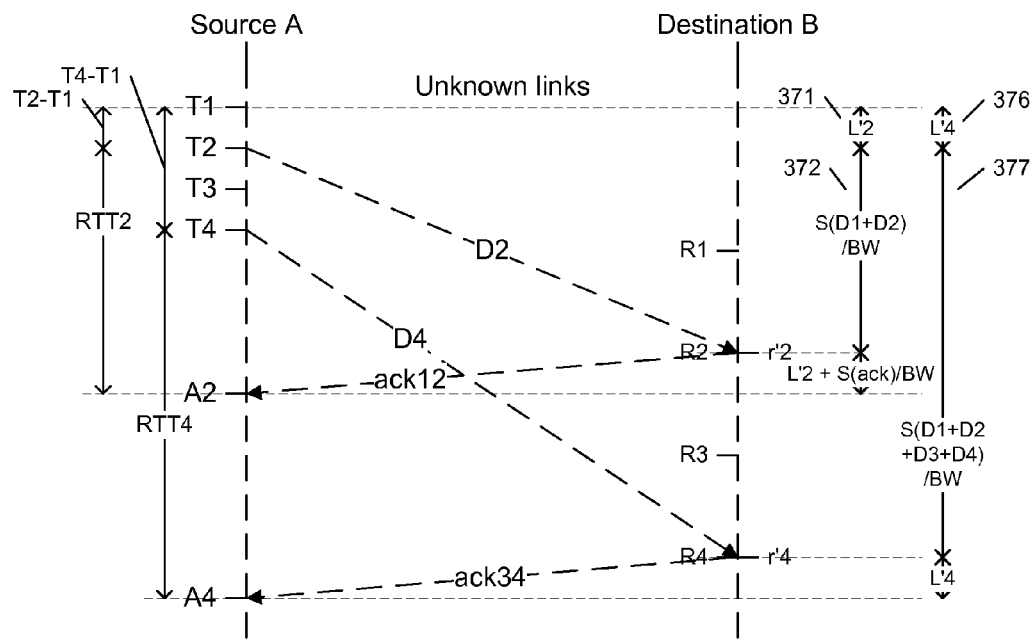

FIGS. 3C and 3D illustrate a technique for reducing the amount of unknown delay within the roundtrip time, thereby improving the quality of the latency estimate, and correspondingly improving the quality of estimated times at the destination node based on this estimate.

Because the time 310 between the transmission of packets D1 and D2 is less than the time 320 it will take packet D2 to exit the bottleneck, it is known that packet D2 will be queued until packet D2 is transmitted from the bottleneck. Alternatively stated, it is known that the earliest time that the first byte of packet D2 can be received at the destination D2 is equal to the time of transmitting the packet D1 plus the sum of the latency and the bandwidth delay of packet D1 (size(D1)/BW). The subsequent time required to receive the remaining bytes of packet D2 at destination B is equal to the bandwidth delay of packet D2 (size(D2)/BW). Upon receipt of packet D2, the acknowledgement ack12 is transmitted, incurring a delay equal to the bandwidth delay of the acknowledgement (size(ack12)/BW) plus the latency. Thus, the following relationship holds:

$$A2 = T1 + \text{latency2}(A \text{ to } B) + \text{size}(D1+D2+ack12)/BW + \text{latency2}(B \text{ to } A),$$

as illustrated by the arrow 370 in FIG. 3C.

Assuming that the latency in each direction is equal, and noting that $A2=T2+RTT2$, the latency L'2 associated with the transmission of packet D2 can be expressed as:

$$L'2 = (RTT2 + (T2-T1) - \text{size}(D1+D2+ack12)/BW)/2,$$

where the prime (') is used to distinguish this estimate from the estimate L2 given above.

In like manner, because the time between transmission of packet D1 and D4 is less than the time it will take packets D1-D3 to exit the bottleneck, it is known that packet D4 will be queued in the bottleneck until all of the packets D1-D3 are transmitted from the bottleneck, after which the packet D4 will be received and an acknowledgement sent. Thus, the time A4 of receipt of the acknowledgement of D4 can be expressed as:

$$A4 = T1 + \text{latency4}(A \text{ to } B) + \text{size}(D1+D2+D3+D4+ack34)/BW + \text{latency4}(B \text{ to } A),$$

as illustrated by the arrow 375 in FIG. 3C.

Assuming symmetric latency, and noting that $A4=T4+RTT4$, the latency L'4 associated with the transmission of packet D4 can be expressed as:

$$L'4 = (RTT4 + (T4-T1) - \text{size}(D1+D2+D3+D4+ack34)/BW)/2.$$

In the general case, the revised estimate of latency for packets in a train that are immediately acknowledged can be expressed as:

$$L_X = \frac{RTT_X + (T_X - T_M) - \left(\text{Size}(ACK_X) + \sum_{i=M}^{X} \text{Size}(D_i)\right)/BW_{\min}}{2}, \quad (2)$$

where X indicates the immediately acknowledged packet, M indicates the first packet in the train, and i indicates each of the packets from the first packet M until the acknowledged packet X, the self-congestion train being defined as the sequence of packets for which:

$$T_X - T_M < \sum_{i=X-1}^{M} \text{Size}(D_i)/BW_{\min}.$$

These revised estimated latencies $L_x$ replace the corresponding reliable latency estimates 201, 202, etc. in FIG. 2, which were based on equation (1), for subsequent determination of the time-varying latency, discussed above.

FIG. 3D illustrates the use of these revised latency estimates L'2 and L'4 to estimate the packet-receive and acknowledgment-transmit times r'2 and r'4 at destination node B.

As can be seen in FIG. 3D, relative to FIG. 3B, because more of the time until acknowledgement can be accounted for with known/determinable delays 372, 376, the amount of unknown delay is substantially reduced, thereby substantially reducing the estimated latencies 371, 377. As can be seen, by accounting for the self-congested delay caused by prior packets in the train, the accuracy of the estimated packet-receive and acknowledgement-transmit times r'2 and r'4 at the destination node B is substantially improved.

In the idealized example of FIGS. 3C-3D, the revised estimates r'2 and r'4 are equal to the actual receive times R2 and R4, because the packets D1, ack12, and ack34 each exhibit the same latency; in an actual network, the accuracy of the estimates will be dependent upon the asymmetry of the delays actually experienced by the individual packets. As discussed with respect to FIGS. 3A and 3B, if a data packet experiences a queuing delay caused by congestion, that delay is allocated equally between the data packet and the acknowledgement packet, even though the acknowledgement packet may not experience a congestion delay across the same channel, because it is traveling in the opposite direction, from a narrow bandwidth link to a high bandwidth link, where congestion, and corresponding queuing delays, will generally be slight.

In the example of FIGS. 3A-3D, the acknowledgement packets were assumed to be relatively unaffected by congestion and other factors. However, at the transport level, acknowledgement packets are indistinguishable from data packets; and, in many protocols, an acknowledgment message from node B to node A may be included in an independent data packet from node B to node A. In such cases, the size of the acknowledgement packet may be significant, and the aforementioned bottleneck congestion may affect the acknowledgement packet as well, albeit in a different manner than the aforementioned self-congestion. In the examples of FIGS. 3A-3D, the acknowledgement packet traverses the minimal bandwidth link first, and then traverses the fast link. If, due to other traffic at the bottleneck, the acknowledgement packets are queued, the queuing delay will introduce errors in the latency estimate, because, as noted above, congestion delays through the bottleneck will generally not be symmetric, whereas the allocation of delays to the latency estimate assumes symmetric channels.

Figure 4A:
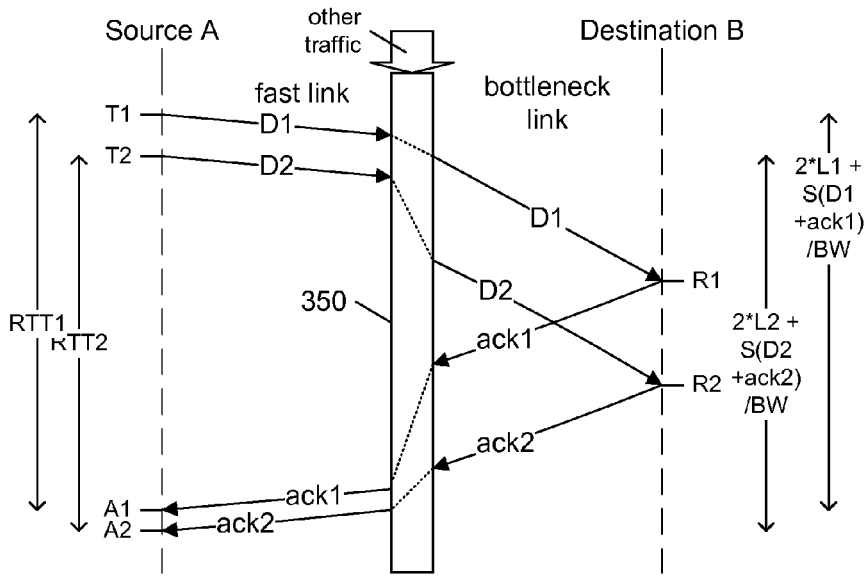
FIGS. 4A-4B illustrate the estimation and refinement of latencies for a train of packets that exhibit post-congestion delays.
Figure 4B:
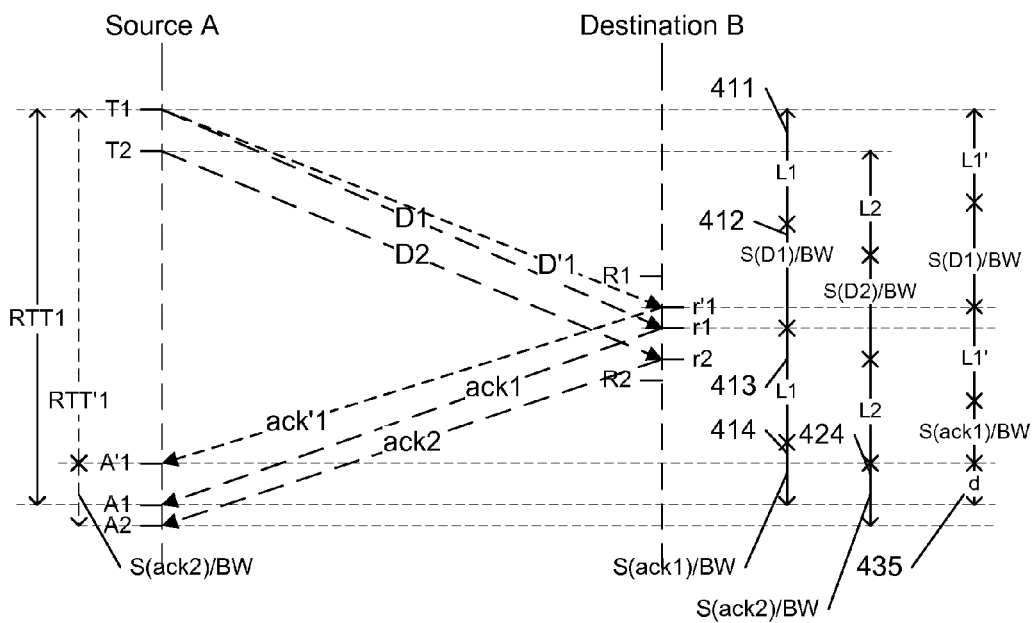

FIGS. 4A and 4B illustrate a possible effect of congestion on the return path through a bottleneck, and a technique for improving the accuracy of the latency estimate when such "post-congestion" is detected.

FIG. 4A illustrates two data packets D1 and D2 that are transmitted on a wide bandwidth link at times T1 and T2, respectively. These packets D1, D2 are queued at the bottleneck 350 as they are communicated to destination B, and arrive at destination node B at times R1 and R2. Destination node B responds with immediate acknowledgements ack1 and ack2, which in this example are dataful packets of substantial size.

The acknowledgement packet ack1 is illustrated as being substantially delayed at the bottleneck 350, as might be caused by the occurrence of other traffic at the bottleneck, whereas the second acknowledgement packet ack2 experiences a much shorter delay at the bottleneck. Due to this unequal congestion delay at the bottleneck 350, the acknowledgements ack1, ack2 arrive at the source node A in close time proximity, at times A1 and A2. As discussed above, congestion delays introduce errors in the estimated transmission times, because the congestion is allocated equally to the data latency and the acknowledgement latency. In this example, because the arrival of acknowledgement ack1 is delayed at the bottleneck, the estimated transmit time from destination node B will be later than the actual transmit time.

As in the case of self-congested delay, some of the error that is introduced by post-congestion delay can be removed by reducing the amount of unknown error in the roundtrip time.

Post-congestion is detected by comparing the interarrival time between received packets, and determining whether it was feasible for these packets to have been spaced by this amount of time while traversing the minimum bandwidth link. That is, if there is no post-congestion delay, the packet arrivals will be spaced by at least an amount equal to the minimum bandwidth delay associated with the arriving packets. If the interarrival time between ack1 and ack2 is less than the minimum bandwidth delay associated with ack2, then ack1 must have been delayed more than ack2, narrowing the time between ack1 and ack2 at the bottleneck. Because this delay of ack1 at the bottleneck is known to be associated with ack1, and not D1, this delay can be removed from the remainder delay in the roundtrip time that is allocated to both ack1 and D1.

FIG. 4B illustrates the adjustment of the estimated latency associated with ack1 and D1 to reduce the effects of post-congestion delay. The components of the roundtrip times RTT1 and RTT2 are displayed on the right side of FIG. 4B. Data packet D1 experiences a latency delay, L1 411, and a bandwidth delay, size(D1)/BW 412, before it is received at destination B, and the acknowledgement packet ack1 experiences a latency delay, L1 413, and a bandwidth delay, size(ack1)/BW 414 before it is received at source node A. A similar partitioning of delays is illustrated corresponding to RTT2.

As illustrated, the gap between A1 and A2 is less than the known bandwidth delay of the acknowledgement packet ack2, size(ack2)/BW 424. Thus, packet ack1 must have experienced a post-congestion delay. Alternatively stated, if packet ack2 arrived at time A2, packet ack1 should have arrived before time A2-size(ack2)/BW, because it is known that packet ack1 was transmitted from destination node B before the first byte of packet ack2 was transmitted. That is, the delay d 435 between the time A1 that acknowledgement ack1 was received, and the time A'1 that it should have arrived (or sooner), is known to be associated with the acknowledgement packet ack1, and is not included in the remainder delay that is allocated to both the data packet D1 and the acknowledgement packet ack1. Expressed mathematically:

$$RTT1-d=2*\text{latency'1}+\text{size}(D1)/BW+\text{size}(ack1)/BW,$$

where: d=size(ack2)/BW−(A2−A1).

The revised latency estimate L'1 131 is illustrated in FIG. 4B, as is the revised receive time r'1 of the packet D1 at destination node B based on this revised latency estimate.

The above described determination of the time before which an acknowledgement should have arrived, based on the size of a subsequent acknowledgement, is not limited to an immediately subsequent acknowledgement. That is, if multiple packets exhibit post-congestion and 'bunch up', the time before which each acknowledgement should have arrived will be dependent upon the arrival of the last acknowledgement, the bandwidth delay of the last acknowledgement, and the bandwidth delay associated with each of the intervening acknowledgement. In the general case, the revised latency for each acknowledgement in a post-congestion train can be estimated as:

$$L_X = \frac{RTT_X + (A_M - A_X) - \left(\text{Size}(D_X) + \sum_{i=X}^{M} \text{Size}(ACK_i)\right)/BW_{\min}}{2}, \quad (3)$$

where A is the time of receipt of the acknowledge packet, X is the index of the current packet, M is the last successive packet in the post-congestion train, and i indicates each of the packets from the current acknowledge packet X until the last acknowledged packet M in the train, the post-congestion train being defined as the sequence of packets for which:

$$A_M - A_X < \sum_{i=X+1}^{M} \text{Size}(ACK_i).$$

As in the case of self-congestion-corrected latencies defined by equation 2, the revised post-congestion-corrected latencies defined by equation 3 replace the latency estimates defined by equation 1, and the corresponding latency estimates 201, 202, etc. in FIG. 2 that are used to estimate the overall time-varying latency.

Figure 5:
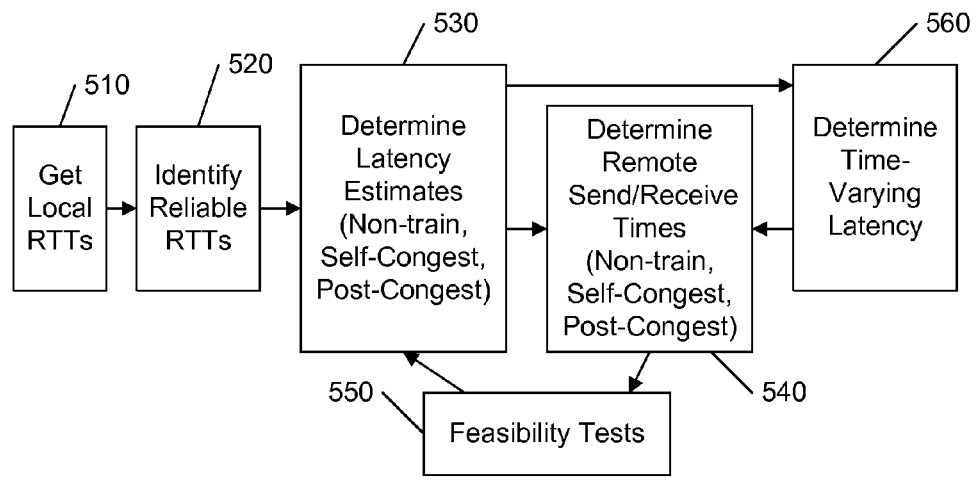
FIG. 5 illustrates an example block diagram of a latency estimation system.

FIG. 5 illustrates an example flow diagram for estimating time-varying latency based on the above described processing of incomplete network trace information.

At 510, the trace information is processed to determine the round-trip times associated with the pair of source-destination nodes being analyzed. In this context, the source node is the node at which the trace information was captured (the local node), and the round-trip time is the time from the transmission of a packet from the source node to a destination node to the receipt of an acknowledgement of receipt of the packet, or other response to the transmitted packet, from the destination node. The parent U.S. patent application to this application Ser. No. 11/490,586, filed 21 Jul. 2006, discloses techniques for efficiently determining roundtrip times for pairs of transmission-response packets.

At 520, the roundtrip times are assessed to determine the expected reliability of each roundtrip measure. As discussed above, roundtrip times associated with zero or little acknowledgement delay are generally more reliable than others. These assumed-reliable roundtrip times are identified as the samples that will be used to determine corresponding latency estimates, at 520, from which the overall time-varying latency will be determined, at 560.

At 530, the latency estimates will be determined, using equations (1), (2), and/or (3) above, depending upon whether the roundtrip times are associated with trains of packets. As discussed above, trains are identified by the characteristics of the intervals between transmission packets, and/or the intervals between reception packets, relative to the bandwidth delay corresponding to each packet's transmission across the minimum bandwidth link of the communication path between the source and destination nodes. Trains may incur self-congestion delays, post-congestion delays, or a combination of both, and the latency estimates provided by equations (2) and (3) are corrected for at least a part of these delays, as discussed above with regard to FIGS. 3A-3D and 4A-4B.

At 540, the latency estimates from the reliable roundtrip times are initially applied to the corresponding local transmission and reception times to determine the corresponding estimated remote reception and transmission times; and at 550, these resultant transmission and reception times are tested for feasibility, primarily to assure that no responses are determined to have been generated before the packet being responded to is determined to have arrived. In a preferred embodiment, the reception and transmission times for acknowledged packets in a packet train are processed differently from non-train packets, to provide a potentially more accurate estimate based on the characteristics of packet trains.

For packets that are not in a packet train, the estimated packet receive time is equal to the packet transmit time plus the estimated latency plus the bandwidth delay associated with the packet (size(packet)/BW, where BW is the bandwidth of the minimum bandwidth link), and the transmit time is equal to the receive time less the sum of the latency and the bandwidth delay.

For packets that are in a self-congesting train, wherein the packets are transmitted faster than the minimum bandwidth link will be able to forward them, the estimated packet receive time for the first packet in the train is the same as that of a non-train packet: transmit time plus latency plus bandwidth delay. For subsequent packets in the train, the estimated packet receive time is equal to the first packet's receive time plus the bandwidth delay of each of the prior packets until the beginning of the train (see FIG. 3A, wherein the span between packets leaving the bottleneck 350 is equal to the bandwidth delay 320 of each packet).

For packets that are in a post-congestion train, wherein the packets are received faster than the minimum bandwidth link would have been able to forward them, the last received packet's transmission time is estimated as in a non-train packet case: receive time minus the bandwidth delay of the last packet. For prior packets in the post-congestion train, each packet's estimated transmit time is equal to the last packet's receive time minus the sum of the latency and the bandwidth delay of all of the subsequently received packets until the end of the train.

The resultant receive and send time estimates are processed at 550 to assure that the estimates are feasible. Generally, these estimates will be feasible, because the latency estimates are based on assumed-reliable roundtrip times; however, if an infeasible estimate is found, block 530 is configured to redetermine the latency estimate, typically by providing a more conservative estimate that resolves the conflict, such as using an average of the two latencies that cause the conflict.

After all of the assumed-reliable latency estimates are verified as feasible based on the receive and transmit times implied by these estimates, they are processed at 560 to determine the time-varying latency, as discussed above with regard to FIG. 2. That is, for example, the latency between each of the assumed-reliable latency estimates 201, 202, 203, etc. is assumed to be linear, as illustrated by dashed line 240. Using this time-varying latency estimate, the estimated latency of each of the intervening packets 211, 212, etc., is determined 211', 212', etc. by the prediction of the latency 211', 212', etc., at the packet's local transmit or receive time.

The estimated latencies (211', 212', etc. of FIG. 2) of these intervening transmitted or received packets are used to estimate the corresponding receive or transmit times at the remote node, at 540, using the techniques discussed above. These estimated times are also tested for feasibility, at 550. When the estimated receive or transmit times indicate an infeasible situation, the aforementioned time-varying latency estimate is adjusted to eliminate the conflict, as discussed above, for example, with regard to estimated latency 245 of FIG. 2, to produce, via 560 of FIG. 5, a revised time-varying latency function as illustrated by dashed line 250 in FIG. 2.

The revised time-varying latency function, from 560, is used to provide revised estimates of the remote receive and transmit times, at 540, and these revised estimates are tested for feasibility, at 550. If any of the revised remote transmit and receive time estimates are infeasible, the cycle 530-560-540-550 is repeated until the estimated latencies and corresponding time-varying latency function provide feasible estimates of activity at the remote site corresponding to the collected trace information at the local site. This self-consistent latency function, and/or the resultant estimates of transmissions and receptions at the remote site are thereafter provided to other network analysis tools, such as a tool that displays the communications between source and destination nodes as a function of time, or a tool that simulates other activity on the network subject to the latencies predicted by the time-varying latency function.

Figure 6:
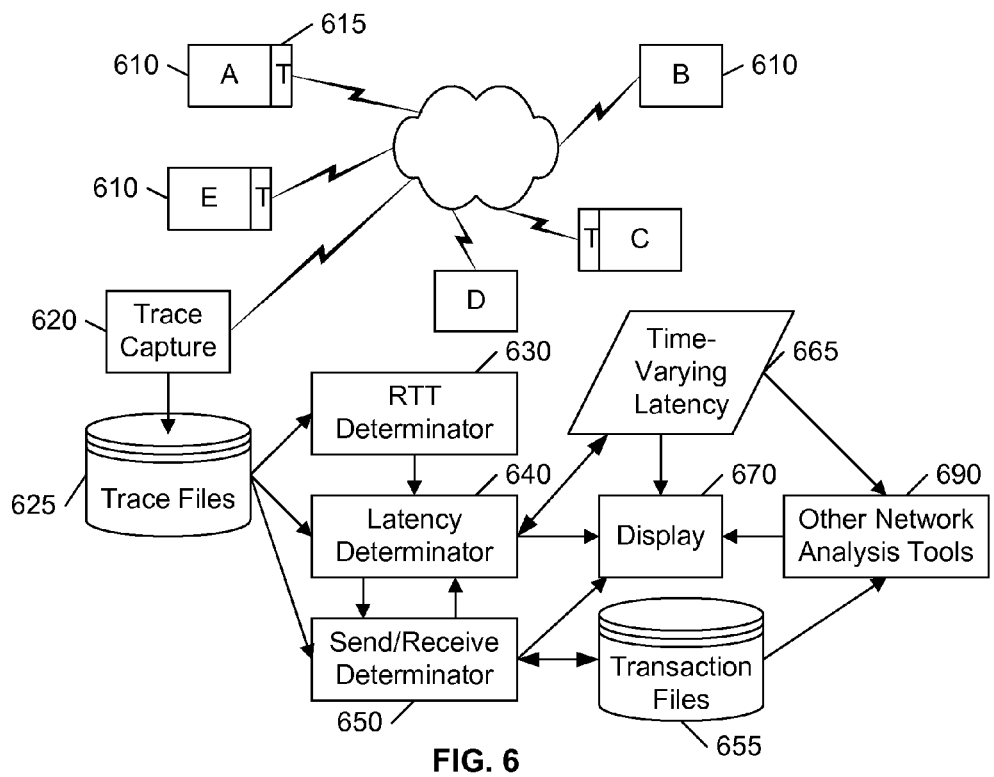
FIG. 6 illustrates an example flow diagram for estimating time-varying latency based on network trace information.

For completeness, FIG. 6 illustrates an example block diagram of a latency estimation system for performing the above latency and time estimation processes.

A trace device 620 is configured to collect data from one or more trace capture agents 615 on a network of nodes A, B, C, etc. 610. As illustrated, there are more nodes 610 than capture agents 615, and therefore activity at nodes B, D without capture agents can only be deduced from the known activity at the nodes A, C, E, that include capture agents 615.

The trace device 620 is preferably configured to organize the trace data from the capture agents 615 in one or more trace files 625 that facilitate processing based on an identification the source and destination of each message and the times of transmission and reception at the capture agent 615 that is local to a source node.

A roundtrip time determinator 630 is configured to determine transmit-receive pairs of packets at the local node from which a roundtrip time corresponding to each pair can be determined. In a typical embodiment, the roundtrip time is determined from the time of transmission of a data packet to the time of receipt of an acknowledgement of receipt of the data packet at the destination node. The roundtrip determinator 630 is also configured to distinguish assumed-reliable roundtrip times, such as those corresponding to the receipt of an immediate acknowledgement.

A latency determinator 640 is configured to estimate a latency associated with each assumed-reliable roundtrip time, preferably using equations (1), (2), and/or (3), detailed above. The latency determinator 640 also determines a time-varying latency function 665 based on these latency estimates. Based on the time-varying latency function, a send/receive time determinator 650 estimates the time of reception or transmission of each packet at the remote node, and verifies the feasibility of these estimates. The latency determinator 640 adjusts the estimated latencies and/or the time-varying latency function 665 as necessary to resolve any conflicts that produce estimated send or receive times that are infeasible.

The send/receive time determinator 650 is preferably configured to store the actual transmit and receive times of packets at the local node and the estimated receive and transmit times of these packets at the destination node in a transaction file 655.

The time-varying latency function 665 and transaction files 655 that are provided by the latency estimation system of this invention can subsequently be used 690 to visualize and/or analyze the captured transactions, or to provide a database for subsequent analyses or predictions.

One of skill in the art will recognize that the visualization of the information gained by this invention can take a variety of forms. In addition to presenting the send and receive times for each message in a tabular form, the exchange of messages as a function of time can be presented in graphic form, such as in a Data Exchange Chart, wherein each node is represented by a horizontal or vertical time-line, and each message is represented by a line or arrow linking the two node time-lines at the corresponding send and receive times, such as illustrated in FIGS. 1A, 1B, 3A, 3B, etc. In like manner, the latency can be graphically illustrated as a function of time, such as illustrated in FIG. 2. Similarly, statistics based on the determined latency, such as an average, peak, variance, running average, trend, and so on, may be displayed for each node-pair.

Any of the other information provided by this invention may also be graphically displayed, typically as a function of time, or as a statistic related to the node-pair. For example, in addition to the latency delay, the aforementioned definable portions of the overall delay caused by bandwidth delay, self-congestion, and/or post-congestion can be displayed, to facilitate a visualization and understanding of the known and unknown components of the overall delay. As noted above, providing an immediate visualization of the causes of delays within a network using on-line data capture techniques can be particularly effective for diagnosing and analyzing network performance degradation and other network anomalies.

In addition to providing this display of information within the system that embodies this invention, the database 665 containing the time-varying latencies can be suitably modified to contain the other information determined by system to facilitate the display of the various components of delay by other network analysis tools 690.

The foregoing merely illustrates the principles of the invention. It will thus be appreciated that those skilled in the art will be able to devise various arrangements which, although not explicitly described or shown herein, embody the principles of the invention and are thus within its spirit and scope. For example, additional and/or alternative rules or hypotheses may be applied to further reduce the remainder delay after subtracting known or assumed delays from the roundtrip time. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, one or more of the software portions may be embodied on a non-transient computer readable medium;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:

determining, by a network analysis system, a plurality of round-trip times at a first node, each roundtrip time being associated with communication of a pair of messages between the first node and a second node, determining, by the network analysis system, first latency estimates corresponding to the roundtrip times of the plurality of roundtrip times, each first latency estimate being based on the corresponding roundtrip time and a minimum bandwidth delay associated with the pair of messages corresponding to the roundtrip time, determining, by the network analysis system, a time-varying latency function based on the first latency estimates, and estimating, by the network analysis system, one or more times of communication of one or more of the pairs of messages at the second node, based on the time-varying latency function and corresponding times of communication of the one or more pairs of messages at the first node.

2. The method of claim 1, including:

determining other times of communication between the first node and the second node at the first node, and estimating one or more other times of communication at the second node, based on the time-varying latency function and the corresponding other times of communication at the first node.

3. The method of claim 2, including:

identifying one or more conflicting times of communication at the second node, determining second latency estimates that resolve the conflicting times, and modifying the time-varying latency function based on the second latency estimates.

4. The method of claim 1, including calculating the minimum bandwidth delay by dividing a size of the pair of messages by a bandwidth of a minimum bandwidth link between the source node and the destination node.

5. The method of claim 1, wherein determining each first latency estimate includes:

subtracting the minimum bandwidth delay from the corresponding roundtrip time to provide a remainder delay, and allocating the remainder delay to a transmit latency associated with a communication path from the first node to the second node and a receive latency associated with a communication path from the second node to the first node.

6. The method of claim 5, wherein allocating the remainder delay includes allocating half of the remainder delay to each of the transmit latency and the receive latency.

7. The method of claim 1, including identifying a sequence of the pairs of messages corresponding to a transmitted train of messages, wherein determining each first latency estimate includes:

determining a revised roundtrip time for each pair of messages relative to a time of transmission of a first transmitted message of the transmitted train of messages, determining a composite bandwidth delay corresponding to the minimum bandwidth delay of each preceding transmitted message of the transmitted train, and subtracting the composite bandwidth delay from the revised roundtrip time to provide a remainder delay, and allocating the remainder delay to a transmit latency associated with a communication path from the first node to the second node and a receive latency associated with a communication path from the second node to the first node.

8. The method of claim 7, including displaying a delay measure based on the composite bandwidth delay.

9. The method of claim 7, wherein allocating the remainder delay includes allocating half of the remainder delay to each of the transmit latency and the receive latency.

10. The method of claim 7, wherein estimating the one or more times of communication at the second node includes:
   estimating a receive time of the first transmitted message at the second node based on the transmit latency and a bandwidth delay corresponding to the first transmitted message, and
   estimating a receive time of each of other transmitted messages of the transmitted train based on the receive time of the first transmitted message and a bandwidth delay of each succeeding message of the transmitted train.

11. The method of claim 10, including displaying the communication of the one or more of the pairs of messages as a function of time, based on the times of communication at the first node and the corresponding receive times of the communications at the second node.

12. The method of claim 1, including identifying a sequence of the pairs of messages corresponding to a received train of messages, and determining each first latency estimate includes:
   determining a revised roundtrip time for each pair of messages relative to a time of transmission of a last transmitted message of the transmitted train of messages,
   determining a composite bandwidth delay corresponding to the minimum bandwidth delay of each succeeding received message of the received train,
   subtracting the composite bandwidth delay from the revised roundtrip time to provide a remainder delay, and
   allocating the remainder delay to a transmit latency associated with a communication path from the first node to the second node and a receive latency associated with a communication path from the second node to the first node.

13. The method of claim 12, including displaying a delay measure based on the composite bandwidth delay.

14. The method of claim 12, wherein allocating the remainder delay includes allocating half of the remainder delay to each of the transmit latency and the receive latency.

15. The method of claim 12, wherein estimating the one or more times of communication at the second node includes:
   estimating a transmit time of the last received message at the second node based on the receive latency and a bandwidth delay corresponding to the first received message, and
   estimating a transmit time of each of other received messages of the received train based on the transmit time of the first received message and a bandwidth delay of each preceding message of the received train.

16. The method of claim 15, including displaying the communication of the one or more of the pairs of messages as a function of time, based on the times of communication at the first node and the corresponding transmit times of the communications at the second node.

17. The method of claim 1, including determining a minimum bandwidth between the first node and the second node, and determining the minimum bandwidth delay based on the minimum bandwidth and a size of each of the pair of messages.

18. The method of claim 1, including displaying the time-varying latency function as a function of time.

19. The method of claim 1, including displaying the communication of the one or more of the pairs of messages as a function of time, based on the times of communication at the first and second nodes.

20. A system comprising:
   a round-trip determinator that determines a plurality of round-trip times at a first node, each roundtrip time being associated with communication of a pair of messages between the first node and a second node,
   a latency determinator that:
      determines first latency estimates corresponding to the roundtrip times of the plurality of roundtrip times, each first latency estimate being based on the corresponding roundtrip time and a minimum bandwidth delay associated with the pair of messages corresponding to the roundtrip time, and
      determines a time-varying latency function based on the first latency estimates, and
   a time determinator that estimates one or more times of communication of one or more of the pairs of messages at the second node, based on the time-varying latency function and corresponding times of communication of the one or more pairs of messages at the first node.

21. The system of claim 20, wherein the latency determinator determines other times of communication between the first node and the second node at the first node, and the time determinator estimate one or more other times of communication at the second node, based on the time-varying latency function and the corresponding other times of communication at the first node.

22. The system of claim 21, wherein the latency determinator:
   identifies one or more conflicting times of communication at the second node,
   determines second latency estimates that resolve the conflicting times, and
   modifies the time-varying latency function based on the second latency estimates.

23. The system of claim 20, wherein the latency determinator:
   identifies a sequence of the pairs of messages corresponding to a transmitted train of messages, and
   determines each first latency estimate by:
      determining a revised roundtrip time for each pair of messages relative to a time of transmission of a first transmitted message of the transmitted train of messages,
      determining a composite bandwidth delay corresponding to the minimum bandwidth delay of each preceding transmitted message of the transmitted train, and
      subtracting the composite bandwidth delay from the revised roundtrip time to provide a remainder delay, and
      allocating the remainder delay to a transmit latency associated with a communication path from the first node to the second node and a receive latency associated with a communication path from the second node to the first node.

24. The system of claim 23, wherein the latency determinator displays a delay measure based on the composite bandwidth delay.

25. The system of claim 23, wherein the time determinator estimates the one or more times of communication at the second node by:

estimating a receive time of the first transmitted message at the second node based on the transmit latency and a bandwidth delay corresponding to the first transmitted message, and estimating a receive time of each of other transmitted messages of the transmitted train based on the receive time of the first transmitted message and a bandwidth delay of each succeeding message of the transmitted train.

26. The system of claim 25, wherein the latency determinator displays the communication of the one or more of the pairs of messages as a function of time, based on the times of communication at the first node and the corresponding receive times of the communications at the second node.

27. The system of claim 20, wherein the latency determinator:

identifies a sequence of the pairs of messages corresponding to a received train of messages, and determines each first latency estimate by:

determining a revised roundtrip time for each pair of messages relative to a time of transmission of a last transmitted message of the transmitted train of messages, determining a composite bandwidth delay corresponding to the minimum bandwidth delay of each succeeding received message of the received train, subtracting the composite bandwidth delay from the revised roundtrip time to provide a remainder delay, and allocating the remainder delay to a transmit latency associated with a communication path from the first node to the second node and a receive latency associated with a communication path from the second node to the first node.

28. The system of claim 27, wherein the latency determinator displays a delay measure based on the composite bandwidth delay.

29. The system of claim 27, wherein the time estimator estimates the one or more times of communication at the second node by:

estimating a transmit time of the last received message at the second node based on the receive latency and a bandwidth delay corresponding to the first received message, and estimating a transmit time of each of other received messages of the received train based on the transmit time of the first received message and a bandwidth delay of each preceding message of the received train.

30. The system of claim 29, wherein the latency determinator displays the communication of the one or more of the pairs of messages as a function of time, based on the times of communication at the first node and the corresponding transmit times of the communications at the second node.

31. The system of claim 20, wherein the latency determinator:

determines a minimum bandwidth between the first node and the second node, and determines the minimum bandwidth delay based on the minimum bandwidth and a size of each of the pair of messages.

32. The system of claim 20, wherein the latency determinator displays the time-varying latency function as a function of time.

33. The system of claim 20, wherein the latency determinator displays the communication of the one or more of the pairs of messages as a function of time, based on the times of communication at the first and second nodes.

34. A computer program stored on a non-transitory computer readable medium that is configured to cause a processor to:

determine a plurality of round-trip times at a first node, each roundtrip time being associated with communication of a pair of messages between the first node and a second node, and determine first latency estimates corresponding to the roundtrip times of the plurality of roundtrip times, each first latency estimate being based on the corresponding roundtrip time and a minimum bandwidth delay associated with the pair of messages corresponding to the roundtrip time, determine a time-varying latency function based on the first latency estimates, and estimate one or more times of communication of one or more of the pairs of messages at the second node, based on the time-varying latency function and corresponding times of communication of the one or more pairs of messages at the first node.

35. The computer program of claim 34, that is configured to cause the processor to:

determine other times of communication between the first node and the second node at the first node, and estimate one or more other times of communication at the second node, based on the time-varying latency function and the corresponding other times of communication at the first node.

36. The computer program of claim 35, that is configured to cause the processor to:

identify one or more conflicting times of communication at the second node, determine second latency estimates that resolve the conflicting times, and modifying the time-varying latency function based on the second latency estimates.

37. The computer program of claim 34, that is configured to cause the processor to:

determine each first latency estimate by:

subtracting the minimum bandwidth delay from the corresponding roundtrip time to provide a remainder delay, and allocating the remainder delay to a transmit latency associated with a communication path from the first node to the second node and a receive latency associated with a communication path from the second node to the first node.

38. The computer program of claim 34, that is configured to cause the processor to:

identify a sequence of the pairs of messages corresponding to a transmitted train of messages, and determine each first latency estimate by:

determining a revised roundtrip time for each pair of messages relative to a time of transmission of a first transmitted message of the transmitted train of messages, determining a composite bandwidth delay corresponding to the minimum bandwidth delay of each preceding transmitted message of the transmitted train, and subtracting the composite bandwidth delay from the revised roundtrip time to provide a remainder delay, and allocating the remainder delay to a transmit latency associated with a communication path from the first node to the second node and a receive latency associated with a communication path from the second node to the first node.

39. The computer program of claim 38, that is configured to cause the processor to estimate the one or more times of communication at the second node by:
- estimating a receive time of the first transmitted message at the second node based on the transmit latency and a bandwidth delay corresponding to the first transmitted message, and
- estimating a receive time of each of other transmitted messages of the transmitted train based on the receive time of the first transmitted message and a bandwidth delay of each succeeding message of the transmitted train.

40. The computer program of claim 39, that is configured to cause the processor to display the communication of the one or more of the pairs of messages as a function of time, based on the times of communication at the first node and the corresponding receive times of the communications at the second node.

41. The computer program of claim 34, that is configured to cause the processor to:
- identify a sequence of the pairs of messages corresponding to a received train of messages, and
- determine each first latency estimate by:
  - determining a revised roundtrip time for each pair of messages relative to a time of transmission of a last transmitted message of the transmitted train of messages,
  - determining a composite bandwidth delay corresponding to the minimum bandwidth delay of each succeeding received message of the received train,
  - subtracting the composite bandwidth delay from the revised roundtrip time to provide a remainder delay, and
  - allocating the remainder delay to a transmit latency associated with a communication path from the first node to the second node and a receive latency associated with a communication path from the second node to the first node.

42. The computer program of claim 41, that is configured to cause the processor to display a delay measure based on the composite bandwidth delay.

43. The computer program of claim 41, that is configured to cause the processor to estimate the one or more times of communication at the second node by:
- estimating a transmit time of the last received message at the second node based on the receive latency and a bandwidth delay corresponding to the first received message, and
- estimating a transmit time of each of other received messages of the received train based on the transmit time of the first received message and a bandwidth delay of each preceding message of the received train.

44. The computer program of claim 43, that is configured to cause the processor to display the communication of the one or more of the pairs of messages as a function of time, based on the times of communication at the first node and the corresponding transmit times of the communications at the second node.

45. The computer program of claim 34, that is configured to cause the processor to:
- determine a minimum bandwidth between the first node and the second node, and
- determine the minimum bandwidth delay based on the minimum bandwidth and a size of each of the pair of messages.

46. The computer program of claim 34, that is configured to cause the processor to display the time-varying latency function as a function of time.

47. The computer program of claim 34, that is configured to cause the processor to display the communication of the one or more of the pairs of messages as a function of time, based on the times of communication at the first and second nodes.

* * * * *